United States Patent Office 2,977,362
Patented Mar. 28, 1961

2,977,362
PIPERAZINE DERIVATIVES

Charles Ferdinand Huebner, Chatham, N.J., assignor to Ciba Pharmaceutical Products, Inc., Summit, N.J., a corporation of New Jersey No Drawing. Filed Dec. 18, 1957, Ser. No. 703,494

7 Claims. (Cl. 260—268)

This invention relates to piperazine compounds. More particularly it relates to 1-(acyloxy-lower alkyl)-4-carbamyl-piperazines and salts thereof, as well as to process for the preparation of such compounds.

The acyl radical of the acyloxy group stands for the acyl radical of a carboxylic acid, such as a lower aliphatic carboxylic acid, for example, a lower alkanoic acid, e.g. acetic, propionic, butyric, trimethylacetic acid, etc.; or lower alkenoic acid, e.g. acrylic, propargylic acid, etc.; aromatic carboxylic acids, e.g. benzoic, 1- or 2-naphthoic acid, etc.; aralkyl carboxylic acid, e.g. phenylacetic or diphenylacetic acid, etc. These acyl radicals, especially the aromatic acyl radicals, may contain additional substituents, such as lower alkyl, e.g. methyl or ethyl; hydroxyl; lower alkoxy, e.g. methoxy, ethoxy or methylenedioxy; acyloxy, e.g. acetoxy or ethoxy-carbonyloxy; nitro; amino; secondary amino, e.g. methylamino; tertiary amino, e.g. dimethylamino; or halogen, e.g. chlorine or bromine. The acyl radical may also be furnished by a carbamic acid, e.g. N,N-dimethyl-carbamic acid, N-phenyl-carbamic acid or N-naphthyl-carbamic acid.

The lower alkyl radical, linking the acyloxy group with one of the nitrogen atoms of the piperazine radical, contains preferably from 2 to 3 carbon atoms and may be represented by 1,2-ethylene, 1,2-propylene or 1,3-propylene.

The nitrogen atom of the carbamyl radical, which radical is present in the 4-position of the piperazine ring, may be unsubstituted or substituted by at least one substituent. Substituents are hydrocarbon radicals, such as lower alkyl, e.g. methyl or ethyl; aryl, e.g. phenyl or 1- or 2-naphthyl; or aralkyl, e.g. benzyl. Such substituents may also contain additional groups, such as those outlined hereinbefore for the acyl radical.

The carbon atoms of the piperazine radical are preferably unsubstituted or may contain as substituents lower alkyl radicals, e.g. methyl or ethyl.

Salts of the new compounds of this invention are particularly therapeutically useful acid addition salts such as those with inorganic acids, such as, hydrohalic acids, e.g. hydrochloric or hydrobromic acid; perchloric, nitric or thiocyanic acid; sulfuric or phosphoric acids; or those with organic acids, such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenyl-acetic, p-aminobenzoic, p-hydroxybenzoic, anthranilic, cinnamic, mandelic, salicyclic, 4-amino-salicylic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

The new piperazine compounds and the salts thereof show anticholinergic properties coupled with a low acute toxicity and may be used as inhibitors of gastric secretion. The piperazine derivatives of this invention are highly suitable when applied by the oral route, a feature which makes them especially useful as antispasmodics in treatment of gastrointestinal disorders, e.g. of gastric ulcers. An illustrative example of the new series of piperazine compounds having anticholinergic properties is the 1-(2-acetoxyethyl)-4-(N-phenylcarbamyl) - piperazine of the formula:

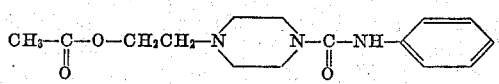

and salts of this compound with hydrohalic acids, e.g. hydrochloric acid.

The new compounds can be used as medicaments in the form of pharmaceutical preparations, which contain the new compounds or salts thereof in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be, for example, in the form of tablets or dragees or in liquid form as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

Although several methods for the preparation of the new compounds may be devised, I prefer to introduce the acyl radical of a carboxylic acid into a 1-(hydroxy-lower alkyl)-4-carbamyl-piperazine or a salt thereof and, if desired, converting any resulting salt into a base, and/or, if desired, any resulting base into a salt.

The acyl radical of a carboxylic acid may be introduced by reacting a 1-(hydroxy-lower alkyl)-4-carbamyl-piperazine or a salt thereof with a carboxylic acid in the form of a reactive derivative thereof, such as an acid halide, e.g. chloride or bromide, or as an anhydride. The reaction is carried out under the usual esterification conditions, for example, in the presence of an acid binding reagent, such as an alkali metal or alkaline earth metal carbonate, e.g. sodium and calcium carbonate or potassium hydrogen carbonate, or an organic base, for example, a tertiary amine, e.g. pyridine or collidine. Solvents, if any, are non-hydroxylated solvents such as hydrocarbons, e.g. hexane, benzene or toluene; esters, e.g. ethyl acetate; or ketones, e.g. acetone. Acid anhydrides or chlorides of lower carboxylic acids, e.g. acetic acid anhydride or acetyl chloride may be employed as reagent and solvent simultaneously. Carbamyl groups may be introduced, as will be shown hereinafter, by reaction with an isocyanate.

The starting materials used in the above reaction are new and are intended to be included within the scope of this invention. The 1-(hydroxy-lower alkyl)-4-carbamyl-pyridazines, in which lower alkyl and carbamyl have the above-given meaning, and salts thereof may be prepared, for example, by treating a hydroxy-lower alkyl-piperazine or a salt thereof with an isocyanate, said isocyanate furnishing the above defined carbamyl radical, or with a reactive derivative of a carbamic acid, for example, a halide, e.g. chloride, of a carbamic acid, and, if desired, converting any resulting salt into the base, and, if desired, converting any resulting base into a salt thereof. A salt is more especially one formed with an inorganic acid, such as hydrohalic acid, e.g. hydrochloric or hydrobromic acid; or sulfuric acid. The reaction of the piperazine derivative with an isocyanate is carried out in the presence of nonhydroxylated solvents, for example, those mentioned hereinbefore. The isocyanate is used in about equimolar amounts; the presence of an excess of the isocyanate in the reaction mixture may be avoided by adding the isocyanate to the solution of 1-hydroxy-lower alkyl-piperazine. The reaction is preferably carried out at room temperature, however may also proceed under cooling or at higher temperatures.

The invention therefore includes also the two-step process for the preparation of the new compounds having anticholinergic activity, which consists in treating a 1-hydroxy-lower alkyl-piperazine or a salt thereof with an isocyanate or a reactive derivative of a carbamic acid, and esterifying in the resulting 1-(hydroxy-lower alkyl)-4-carbamyl-piperazine or a salt thereof the free hydroxyl group with a carboxylic acid.

Depending on the conditions used, any new 1-(acyloxy-1-lower alkyl)-4-carbamyl-piperazine as well as 1- hydroxy-lower alkyl-4-carbamyl-piperazine may be obtained in the form of a free base or a salt thereof. A salt may be converted into the free base in the customary way, e.g. by reaction with an alkali metal hydroxide, e.g. sodium or potassium hydroxide, or with ammonia, e.g. aqueous ammonia. A free base may be transformed into a therapeutically useful acid addition salt by reaction with an appropriate inorganic or organic acid, such as one of the acids outlined hereinbefore using, for example, an alcohol, e.g. methanol or ethanol, solution of an ether, e.g. diethylether, solution or a mixture of such solvents.

The invention also comprises any modification of the general process wherein a compound obtainable as an intermediate at any stage of the process is used as starting material and the remaining step(s) of the process is (are) carried out.

The following examples are given to illustrate the invention. They are not to be construed as being limitations thereon. Temperatures are given in degrees centigrade.

Example 1

A suspension of 10 g. of 1-(2-hydroxyethyl)-4-(N-phenylcarbamyl)-piperazine hydrochloride in 50 ml. of pyridine is treated with 10 ml. of acetic acid anhydride. After standing over night at room temperature, the excess pyridine and acetic acid anhydride are distilled off under reduced pressure, the residue dissolved in 20 ml. of water and made basic with aqueous ammonia. The oily base is extracted with ether, the ether evaporated and the residue dissolved in 10 ml. of ethanol and acidified with 6 N ethanolic hydrogen chloride. The solid material is recrystallized from ethanol and the purified 1-(2-acetoxyethyl)-4-(N-phenylcarbamyl) - piperazine hydrochloride melts at 170–171°.

The starting material may be prepared as follows: To a stirred solution of 20 g. 1-(2-hydroxyethyl)-piperazine in 100 ml. of benzene, held at 20° by external cooling, is added dropwise a solution of 17 ml. of phenylisocyanate in 50 ml. of benzene. After 6 hours the benzene is evaporated to dryness under reduced pressure, the oily residue dissolved in 50 ml. of ethanol and made acid with 6 N ethanolic hydrogen chloride. The 1-(2-hydroxyethyl)-4-(N-phenylcarbamyl)-piperazine hydrochloride is recrystallized from ethanol, M.P. 210–211°.

Example 2

7 g. of crude 1 - (2-hydroxyethyl)-4-(N-phenylcarbamyl)-piperazine is dissolved in 25 ml. of pyridine and treated with 3 ml. of butyryl chloride. After standing 24 hours the pyridine is removed under reduced pressure, the residue is dissolved in water, made basic with aqueous ammonia and extracted with ether. The 1-(2-n-butyroxyethyl)-4-(N-phenylcarbamyl)-piperazine hydrochloride, obtained from the crude base by addition of ethanolic hydrogen chloride, softens at 172–175° with loss of ethanol of recrystallization, resolidifies and remelts at 210°.

Example 3

The 1-(2-acetoxyethyl)-4-[N-naphthyl-(1)-carbamyl]-piperazine is prepared as described in Example 1; the base is converted to the hydrochloride, which melts at 228–229°.

The starting material may be prepared as follows: 20 g. of 1-(2-hydroxyethyl)-piperazine and 26.4 g. of α-napthyl-isocyanate are reacted in benzene as described in Example 1. Removal of most of the benzene leaves the chystalline 1 - (2-hydroxyethyl)-4-[N-naphthyl-(1)-carbamyl]-piperazine, which after recrystallization from a mixture of ethanol and water melts 140–145°.

Example 4

The 1 - (2-acetoxyethyl)-4-(N,N-dimethylcarbamyl)-piperazine is prepared according to the procedure described in Example 1; the oxalate is obtained by adding oxalic acid to an ethanolic solution of the base and melts at 159–160°.

The starting material may be prepared as follows: 10 g. of 1-(2-hydroxyethyl)-piperazine and 8.5 g. dimethyl-carbamic acid chloride are reacted in chloroform at room temperature. After 24 hours the chloroform is removed under reduced pressure and the resulting crude 1-(hydroxyethyl)-4-(N,N-dimethylcarbamyl) - piperazine compound is used without further purification.

Example 5

5 g. of 1 - (2 - hydroxyethyl)-4-(N-phenylcarbamyl)-piperazine is refluxed with 2.7 ml. of phenylisocyanate in 50 ml. benzene for 24 hours. The benzene is partly removed by distillation under reduced pressure and the crystals separating are recrystallized from ethanol. The 1-[2-(N-phenylcarbamyl) - oxyethyl]-4-(N - phenylcarbamyl)-piperazine melts at 180°.

Example 6

By using the procedure outlined in Example 1 the 1-(2-benzoyloxyethyl)-4-(N-phenylcarbamyl) - piperazine hydrochloride melting at 228–230°, is prepared by acting 1 - (2 - hydroxyethyl)-4-(N-phenylcarbamyl)-piperazine with benzoyl chloride.

Example 7

The 1 - (2 - diphenylacetoxy-ethyl)-4-(N-phenylcarbamyl)-piperazine is prepared according to the procedure given in Example 1 by reacting 1-(2-hydroxy-ethyl)-4-(N - phenylcarbamyl) - piperazine with diphenylacetyl chloride, and is identified as the oxalate, M.P. 208°.

The piperazine compounds of the present invention may also be prepared by ring closure to the piperazine ring. Thus by reacting, for example, an N,N-bis-(2-hydroxyethyl)-N carbamyl-amine or a reactive ester thereof, such an ester with a strong inorganic acid, e.g. hydrochloric, hydrobromic, hydriodic or sulfuric acid, or a strong organic, e.g. p-toluene sulfonic acid, with an acyloxy-lower alkylamine, the desired piperazine derivative may be formed.

What is claimed is:

1. A member of the group consisting of 1-(2-acyloxyethyl)-4-(N-aryl - carbamyl) - piperazine, in which acyl represents an acyl radical of an acid selected from the group consisting of lower alkanoic acid, phenyl-acetic acid, diphenyl-acetic acid, benzoic acid, 1-naphthoic acid and 2-naphthoic acid, and aryl represents a member of the group consisting of phenyl, 1-naphthyl and 2-naphthyl, and therapeutically useful acid addition salts thereof.

2. 1 - (2 - acetoxyethyl)-4-(N-phenylcarbamyl)-piperazine.

3. 1 - (2 - butyroxyethyl)-4-(N - phenylcarbamyl)-piperazine.

4. 1 - (2 - acetoxyethyl) - 4 - [N-naphthyl-(1)-carbamyl]-piperazine.

5. 1 - [2 - (N - phenylcarbamyl)-oxy-ethyl]-4-(N-phenylcarbamyl)-piperazine.

6. 1 - (2 - benzoyloxyethyl)-4-(N-phenylcarbamyl)-piperazine.

7. 1-(2-diphenylacetoxy-ethyl)-4-(N-phenylcarbamyl)-piperazine.

References Cited in the file of this patent

UNITED STATES PATENTS

| | | |
|---|---|---|
| 2,467,894 | Kushner et al. | Apr. 19, 1949 |
| 2,467,895 | Kushner et al. | Apr. 19, 1949 |
| 2,489,950 | Blicke | Nov. 29, 1949 |

FOREIGN PATENTS

| | | |
|---|---|---|
| 716,146 | Great Britain | Sept. 29, 1954 |

OTHER REFERENCES

Baltzly et al.: Journ. Amer. Chem. Soc., vol. 66, pages 263–266 (1944).